(12) United States Patent
Learned

(10) Patent No.: US 7,218,690 B2
(45) Date of Patent: May 15, 2007

(54) HYBRID TURBO-MUD FOR MULTIPLE ACCESS SYSTEMS

(75) Inventor: Rachel E Learned, Waltham, MA (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 740 days.

(21) Appl. No.: 10/626,146

(22) Filed: Jul. 24, 2003

(65) Prior Publication Data

US 2005/0018793 A1  Jan. 27, 2005

(51) Int. Cl.
*H04L 27/06* (2006.01)
*H03M 13/03* (2006.01)

(52) U.S. Cl. .................. 375/341; 375/340; 714/795

(58) Field of Classification Search .............. 375/144, 375/148, 260, 262, 340, 341; 714/794, 795
See application file for complete search history.

(56) References Cited

U.S. PATENT DOCUMENTS

| | | | |
|---|---|---|---|
| 5,506,861 | A | 4/1996 | Bottomley |
| 5,563,897 | A | 10/1996 | Pyndiah et al. |
| 6,122,269 | A | 9/2000 | Wales |
| 6,151,370 | A | 11/2000 | Wei |
| 6,167,022 | A | 12/2000 | Ishida et al. |
| 6,182,261 | B1 | 1/2001 | Haller et al. |
| 6,704,376 | B2 * | 3/2004 | Mills et al. .................. 375/341 |
| 6,898,248 | B1 * | 5/2005 | Elgamal et al. ............. 375/259 |
| 2003/0187928 | A1 * | 10/2003 | MacLeod et al. ........... 709/204 |
| 2004/0022336 | A1 * | 2/2004 | Yu et al. ..................... 375/346 |

OTHER PUBLICATIONS

Pottie, Gregory J. et al., A Comparison of Reduced Complexity Decoding Algorithms for Trellis Codes, IEEE J. on Selected Areas in Communications, Dec. 1989, vol. 7., No. 9. pp. 1369-1380.
Berrou, Claude et al., Near Optimum Error Correcting Coding and Decoding: Turbo-Codes, IEEE Trans. on Communications, Oct. 1996, vol. 44, No. 10. pp. 1261-1271.
Berrou, Claude et al., Near Shannon Limit Error—Correcting Coding and Decoding: Turbo Codes(1), IEEE, 1993, pp. 1064-1070.
Duanyi, Wang et al, Low-Complexity MAP Decoding for Turbo Codes, Vehicular Technology Conference, 2000, pp. 1035-1039, Princeton University, Princeton NJ.

(Continued)

*Primary Examiner*—Young T. Tse
(74) *Attorney, Agent, or Firm*—Maine & Asmus

(57) ABSTRACT

The present invention is a high quality real-time Turbo-Mud processing system initially employing a high complexity multi-user detector that results in better estimates of the bit streams, and then the remaining iterations employing a computationally low linear-based-MUD/Turbo-MUD. The present approach uses more computational computations at the first iteration, and less computations on subsequent processing due to cycling through the Turbo-Mud process with a low complexity sub-optimal detector that significantly cleans up the estimates in a few iterations of the Turbo-MUD. The present invention also provides an efficient means of estimating symbols transmitted in a multi-user environment in overloaded or super-saturated conditions.

25 Claims, 5 Drawing Sheets

OTHER PUBLICATIONS

Herzog, Rupert et al, Iterative Decoding and Despreading improves CDMA-Systems using M-ary Orthogonal Modulation and FEC, IEEE, 1997, pp. 909-913.

Das, Suman et al., Computationally Efficient Iterative Multiuser Detection and Decoding, Asilormar 1998, pp. 631-634, Department of Electrical and Computer Engineering, Rice University, Houston, Texas.

Wang, Xiaodong et al, Iterative (Turbo) Soft Interference Cancellation and Decoding for Coded CDMA, IEEE, Trans. on Communications, Jul. 1999, vol. 47, No. 7., pp. 1046-1061.

Poor, Vincent, Turbo Multiuser Detection: An Overview, Department of Electrical Engineering, IEEE 6th International Symposium on Spread-Spectrum Tech. & Appliances, pp. 583-587, Sep. 2000, Princeton University, Princeton NJ.

Alexander, Paul et al., Iterative Multiuser Interference Reduction: Turbo CDMA, IEEE Transactions on Communications, Jul. 1999, vol. 47, No. 7., pp. 1008-1014.

Hagenauer, Joachim et al, A Viterbi Algorithm with Soft-Decision Outputs and its Applications, IEEE, 1989, pp. 1680-1686.

Robertson, Patrick, A Comparison of Optimal and Sub-Optimal MAP Decoding Algorithms Operating in the Log Domain, IEEE, 1995, pp. 1009-1013.

Verdu, S. Minimum Probability of Error For Asynchronous Gaussian Multiple-Access Channels, IEEE Transactions on Informations on Information Theory, vol. IT-32, No. 1, Jan. 1986, p. 85-96.

Lupas, Ruxandra et al, Linear Multiuser Detectors for Synchronous Code-Division Multiple-Access Channels, IEEE Transactions on Information Theory, vol. 35, No. 1, Jan. 1989, p. 123-136.

Lupas, Ruxandra et al, Near-Far Resistance of Multiuser Detectors for Asynchronous Channels, IEEE Transactions on Information Theory, vol. 38, No. 4, Apr. 1990, p. 496-508.

* cited by examiner

HYBRID TURBO-MUD FOR MULTIPLE ACCESS SYSTEMS

RELATED APPLICATIONS

This application is related to U.S. Pat. No. 6,839,390; U.S. Pat. No. 7,110,439; and U.S. application Ser. No. (10/423,655), filed Apr. 25, 2003, titled "Deferred Decorrelating Decision-Feedback Detector For Supersaturated Communications". Each of these applications is herein incorporated in its entirety by reference for all purposes.

FIELD OF THE INVENTION

This present invention relates to advanced receiver techniques for processing signals, and more particularly to multi-user detection (MUD) for processing multiple users' signals that interferer with one another, where the processing must be done in real-time.

BACKGROUND OF THE INVENTION

The telecommunications industry has been expanding at an unprecedented growth rate. In particular, the wireless sector, including cell phones, PCS, wireless local area networks and Bluetooth such as IS95, GSM, 3G, IEEE 802.11a/b/g, and 802.16. The usage has grown far beyond expectations and at a much higher rate than the fixed telecommunications (wired) counterpart. The ability to access data and communicate anywhere at anytime has enormous potential and commercial value.

The content of the wireless sector is also changing, with more and more data being transmitted, including Internet connectivity and live feeds. The usage involving personal digital assistants (PDA's) and even smart appliances have created new markets utilizing wireless data communications. And, this wireless phenomenon is not limited to any geographical boundaries, as the growth is occurring around the globe.

Thus, despite the advancements in wireless transmission and reception, there is a growing problem of extracting more information signals within a limited bandwidth. Emerging multiple-access receiver processing procedures allow for multiple users to access the same communications medium to transmit or receive information. In addition to the problems associated with multiple users in a given bandwidth, an additional problem is the inability to process the data in the receivers in real time. Advanced receiver techniques cover several areas, namely interference suppression (also called Multi-User Detection or MUD), multipath combining and space-time processing, equalization, and channel estimation. These various techniques can be mixed and matched depending upon the circumstances. Proper signal processing of transmitter and receiver yield a far greater potential than current systems.

For example, a base station that processes a number of cellular devices has to receive and transmit data within a certain frequency range. The ability to extract the correct data from a given user is a difficult task when the effects of interference and multipaths are considered. The problem is further complicated when the number of users exceeds the number of dimensions (e.g. time slots, frequency slots, polarizations, etc), resulting in an overloaded condition.

While the discussion herein illustrates wireless cellular communications, the multiple access topologies are equally applicable to wired cable systems and local area networks, read/write operations of a disc drive, satellite communications and any application that benefits from extracting digital information from among many multiple interfering signals.

In the past, multiple access (MA) communication systems generally utilized Frequency Division Multiple Access (FDMA) and Time Division Multiple Access (TDMA) methods to achieve channel access. FDMA refers to the parsing up of an allocated band for a communication system wherein a single user's signal transmission power is concentrated into a single narrower radio frequency band. Interference from adjacent channels is limited by the use of band pass filters however for each channel being assigned a different frequency system, total capacity is limited by the available frequency slots and by physical limitations imposed by frequency reuse.

In TDMA systems, a channel consists of a time slot or frame in a periodic train of time intervals over the same frequency, with a given signal's energy confined to one of these time slots. Adjacent channel interference is limited by the use of a time gate or other synchronization element that only passes signal energy received at the proper time. The system capacity is limited by the available time slots (within a given frequency band) as well as by physical limitations imposed by frequency reuse, as each channel is assigned a different time slot within a particular frequency band.

One of the goals of FDMA and TDMA systems is to try and prevent two potentially interfering signals from occupying the same frequency at the same time. In contrast, Code Division Multiple Access (CDMA) techniques allow signals to overlap in both time and frequency. CDMA signals share the same frequency spectrum at the same time, hence, the CDMA signals appear to overlap one another. The scrambled signal format of CDMA virtually eliminates cross talk between interfering transmitters.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

In operation, a stream of spread information signature signals are modulated by weights corresponding to the information that is to be transmitted. Some modulation examples include binary phase shift keying (BPSK) and quadrature phase shift keying (QPSK). If several transmitters modulate their data onto the signature waveform and modulate again with the carrier tone, a radio frequency (RF) signal comprised of a continuous stream of information modulated signature pulses will be present at the receiver, one corresponding to each transmitter. The plurality of transmitted signals and are jointly received as a composite signal at the receiver. Each of the spread signals overlaps all of the other spread signals in time and frequency. Moreover, environmental noise as well as receiver electronic noise is also present in the measured received signal. The state of the art receiver correlates the composite noisy signal with one of the unique signature sequences, and the corresponding information signal is isolated and despread while the other signals appear as only small additions to the noise floor.

A signature sequence is often used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol.

The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits, where the code is a block or convolutional code. Also, the signature sequence can be much longer than a single transmitted symbol, in which case a subsequence of the signature sequence is used to spread the information bit.

Further descriptions of CDMA communications techniques are described in U.S. Pat. No. 5,506,861. This patent describes radiotelephone communication systems, and in particular, receivers for jointly demodulating a plurality of CDMA signals with multipath time dispersion.

The prior systems do not properly account for the real world mobile communication signals that suffer from signal degradation such as interference and multipath problems. The systems of the state of the art generally tended to make assumptions that all other interferers and multipaths were additive white Gaussian noise. However, this assumption is not accurate for co-channel interference and multipaths.

Multipath dispersion occurs when a signal proceeds to the receiver along not one but many paths so that the receiver encounters echoes having different and randomly varying delays and amplitudes. The receiver receives a composite signal of multiple versions of the transmitted symbol that have propagated along different paths, called rays, having different relative time. Each distinguishable ray has a certain relative time of arrival, a certain amplitude and phase, and as a result, the correlator outputs several smaller spikes. RAKE receivers are well known and attempt to 'rake' together all the contributions to detect the transmitted symbol and recover the information bit.

Conventional RAKE receivers provide satisfactory performance for operation in the presence of multipath under ideal conditions however the signature sequence must be uncorrelated with time shifted versions of itself as well as various shifted versions of the signature sequences of the other CDMA signals. Co-channel interference refers to signals received from other users either directly or reflected. If one received signal corresponding to the signature sequence of interest has a non-negligible cross correlation with the received signal originating from another transmitter (a co-channel interferer), then the value measured at the receiver, e.g. the correlation value for the signal of interest, is corrupted. In other words, the correlation computed at the receiver that would be used to decode a particular signal of interest is overwhelmed by an interfering signal; this is referred to as the near-far problem. The interference caused by an echo of one transmitted symbol overlapping with the next transmitted symbol might also be non-negligible. If this is the case, the transmitted symbols interfere with past and future transmitted symbols. This is commonly referred to as intersymbol interference (ISI). In actuality, performance is degraded both by co-channel interference and ISI.

There has been much research to address signal interference with known multipath time dispersion. This is termed joint demodulation with no multipath and is further described in S. Verdu, "Minimum Probability of Error For Asynchronous Gaussian Multiple-Access Channels," IEEE Trans. Info. Theory, Vol. IT-32, pp. 85–96, R. Lupas and S. Verdu, "Linear multiuser detectors for synchronous code-division multiple-access channels," IEEE Trans. Inform. Theory, Vol. 35, pp. 123–136, January 1989; and R. Lupas and S. Verdu, "Near-far resistance of multiuser detectors in asynchronous channels," IEEE Trans. Commun., Vol. 38, pp. 496–508, April 1990.

There are a host of approaches for jointly demodulating any set of interfering digitally modulated signals, including multiple digitally modulated signals. Maximum Likelihood Sequence Estimation determines the most likely set of transmitted information bits for a plurality of digital signals without multipath time dispersion. The maximum likelihood joint demodulator is capable, in theory, of accommodating the largest number of interfering signals, but has a prohibitive computational complexity that makes it unrealizable in practice. The decorrelation receiver is another, less computationally complex receiver processing approach that zeroes out or decorrelates the different signals so that they no longer interfere with one another. The decorrelator as well as virtually every other lower complexity joint demodulator, is not capable of operation when the number of signals is over a set threshold which falls significantly short of the theoretical maximum.

In a real world multi-user system, there are a number of independent users simultaneously transmitting signals. These transmissions have the real-time problems of multipath and co-channel interference, fading, and dispersion that affect the received signals. As described in the prior art, multiple user systems communicate on the same frequency and at the same time by utilizing parameter and channel estimates that are processed by a multi-user detector. The output of the optimal multi-user detector operating within the multiuser capacity limits of the channel is an accurate estimation as to the individual bits for an individual user.

Moreover, in an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA," a system is described in which multiple users can transmit coded information on the same frequency at the same time, with the multi-user detection system separating the scrambled result into interference-free voice or data streams.

Low complexity multiuser detector have been contemplated that use linear multiuser detectors to achieve optimal near-far resistance. (Near-Far Resistance of Multiuser Detectors for Coherent Multiuser Communications, R. Lupas, S. Verdu, IEEE Trans. Commun. Vol. 38, no. 4, pp 495–508, April 1990). While providing certain advantages, the performance has not been demonstrably improved. Varanasi and Aazhang proposed a multistage technique as described in the article Near-Optimum Detection in Synchronous Code-Division Multiple Access Systems, IEEE Trans. Commun., Vol. 39, No. 5, May 1991.

Decorrelating decision feedback detectors (DDFD) have been described by A. Duel-Hallen in Decorrelating Decision-Feedback Multiuser Detector for Synchronous Code-division Multiple Access Channel, IEEE Trans. Commun., Vol. 41, pp 285–290, February 1993. Wei and Schlegel proposed soft-decision feedback to suppress error propagation of the DDFD in Synchronous DS-SSMA with Improved Decorrelating Decision-Feedback Multiuser Detection, IEEE Trans. Veh. Technol., Vol. 43, pp 767–772, August 1994. Tree-type maximum-likelihood sequence detectors were also proposed for multiuser systems as were breadth-first algorithms and sequential detection including using the M-algorithm tree-search scheme with a matched filter (MF). The prior references also reveal schemes that include some form of decorrelating noise whitening filter (WF).

However, one of the primary disadvantages of the prior references implementations is the inability to accommodate overloaded conditions. Decision feedback techniques are limited in that they are incapable of working in supersaturated environments. Only the MMSE-based decision feedback detector can work in a supersaturated environment, however it is too aggressive with hypothesis testing to produce accurate results.

Multi-user detection (MUD) refers to the detection of data in non-orthogonal multiplexes. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. The number of possible measured levels for the received signal is exponentially related to the number of users and the duration of the ISI. Hence, the optimal processing is a computationally complex and it is not possible to accomplish in a real-time environment. Thus for those multi-user detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are several suboptimal multiuser detectors that are less computationally complex and known in the art. One example of suboptimal detectors, called linear detectors, includes decorrelators, minimum mean square error or MMSE detectors, and zero-forcing block linear equalizers. But, linear algebra based MUD (non-iterative) and successive interference cancellation fails for cases of overloaded multiple access systems. One example of overloading is where the number of simultaneous users is doubled or tripled relative to existing state of the art. Even for under-loaded multiple access systems, the performance of non-iterative MUD and successive interference cancellation degrades significantly as the number of users increases, while the computation complexity of the optimal MUD increases significantly as the number of users increases. The computing problems are so extreme that even the most expensive hardware unbound by size and weight can often to keep us with this overwhelming complex processing requirement of optimal MUD. Moreover, an unreasonable delay would be required to decode each bit or symbol rendering such a system useless in practice.

Reduced complexity approaches based on tree-pruning help to some extent to eliminate the improper bit combination from consideration where, ideally, such a procedure should prune out many 'bad' paths in the decision tree but maintain the proper path. Thus, the entire tree does not need to be traversed to make the final decision.

The M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects are seen for other tree-pruning based MUD (T-algorithm, etc). To combat improper pruning, basic tree-pruning must ensure that M is "large enough", and therefore still encounters increased complexity for acceptable performance levels when the number of interfering signals and/or ISI lengths are moderate to large.

As an illustration of the M-algorithm as a tree-pruning algorithm, consider a tree made up of nodes and branches. Each branch has a weight or metric, and a complete path is sequences of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric. With the present invention the metrics of multiple complete paths are not calculated. Rather, the metrics of individual branches in a tree are calculated in the process of locating one complete path through the tree and thereby defines one unknown characteristic of each of the co-channel, interfering signals needed to decode the signals.

A MUD algorithm within the TurboMUD system determines discrete estimates of the transmitted channel symbols, with the estimates then provided to a bank of single-user decoders (one decoder for each user) to recover the input bit streams of all transmitted signals. Two general types of multi-user detectors within the TurboMUD system are possible, namely those that provide hard outputs, which are discrete values, and those that provide soft outputs, which indicate both the discrete estimate and the probability that the estimate is correct.

However, single-user decoders operating on hard values, or discrete integers, have unacceptable error rates when there is a large amount of interference or noise in the received signal. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1. To provide soft values that can then be utilized by a single-user decoder, the multi-user detector chosen for the TurboMUD can generate these soft values.

The invention described below will work with soft output or a hard output MUDs, or a combination of the two.

In general, soft or hard output versions of the optimum maximum likelihood multi-user detector (Verdu, Multiuser Detection, Cambridge University Press, 1998) or an M algorithm (as described, for instance, in Schlegel, Trellis Coding, IEEE Press, 1997) with a moderate to high value of M causes the Turbo MUD to require too many computations to keep up with real time transmissions. Using a fast, but inferior, multiuser detection scheme such as a linear-based detector or those detailed in the text "Multiuser Detection" by Sergio Verdu causes poor quality output when there are many interferers or users.

Moreover, when dealing with hand-held communications units such as wireless handsets, the amount of processing within the device is limited, directly limiting the amount of computational complexity that is allowed. In order to provide real-time performance both at a cell site and the handset, it therefore becomes important to be able to reduce the amount of computational complexity and processing time so as to achieve real-time performance.

The growing demand for radio communications raises the need to optimize the performance while maximizing the capacity of wireless communications systems. To optimize performance in a multi-user environment either interference must be eliminated or the number of interfering signals must be kept below a pre-determined number. The convention is to eliminate the interference, while virtually all non-optimum MUD techniques keep the number of interfering signals at a low number which is typically far less than multi-user theory allows. Existing approaches fail to address all of the problems presented herein. Therefore, what is needed is an efficient signal processing technique to improve the quality and spectral efficiency of wireless communications and better techniques for sharing the limited bandwidth among different high capacity users.

BRIEF SUMMARY OF THE INVENTION

The invention is devised in the light of the problems of the prior references described herein, and a general object of the present invention is to provide a novel and useful apparatus and technique that solves the problems described herein.

One aspect of the invention is a hybrid Multi-User Detector for processing a plurality of received signals, comprising a parameter estimation unit coupled to the received signals. There is a high complexity multi-user detector coupled to the parameter estimation unit, wherein the high complexity multi-user detector performs a pruned tree search and outputs a plurality of information streams, one stream corresponding to each of the received signals. A bank of high complexity decoders is coupled to the plurality of information streams, wherein the high complexity decoders output a plurality of refined information streams. A low complexity multi-user detector is coupled to the bank of high complexity decoders, the plurality of refined information streams, and the parameter estimation unit, wherein the low complexity multi-user detector outputs a plurality of improved information streams. There is a bank of error correction decoders coupled to the plurality of improved information streams, wherein the error correction decoders output a plurality of refined-improved information streams. The plurality of refined-improved information streams are fed back to the low complexity multi-user detector until a final condition is reached and the bank of error correction decoders output a final plurality of symbol streams.

Another aspect of the invention is a hybrid receiver for processing a plurality of received signals in a super-saturated condition. The receiver comprises a parameter estimation unit coupled to the received signals, wherein the parameter estimation unit extracts received signal information. A front end section is coupled to the received signals and to the received signal information to produce a plurality of filtered received signals. There is a high complexity multi-user detector coupled to the filtered received signals, wherein the high complexity multi-user detector performs a pruned tree search and outputs a plurality of information streams, one stream corresponding to each of the filtered received signals. A bank of high complexity decoders is coupled to the plurality of information streams, wherein the high complexity decoders output a plurality of refined information streams. A low complexity multi-user detector is coupled to the plurality of refined information streams, and the received signal information. The low complexity multi-user detector outputs a plurality of improved information streams and there is a bank of low complexity decoders coupled to the plurality of improved information streams. The low complexity decoders output a plurality of refined-improved information streams, the plurality of refined-improved information streams are then fed back to the low complexity multi-user detector until a final condition is reached and the bank of error correction decoders output a final plurality of symbol streams.

A method of the invention for processing signals from multiple users providing raw digitized data, comprising performing parameter estimation of the raw digitized data, and computing decision tree searching path metrics from the raw digitized data using a high complexity multi-user detector in the first iteration and outputting one symbol stream for each user. There is a step of decoding one symbol stream for each user from the high complexity multi-user detector and producing a higher quality symbol stream for each user. Incorporating the information from the higher quality symbol stream into a low complexity multi-user detector providing an improved version of the symbol streams, one for each user. Decoding the symbol streams output by the low complexity MUD and repeating the steps of incorporating information from the improved symbol stream into the low complexity MUD and decoding of each symbol stream output by the low complexity MUD until a final state is obtained. Finally, outputting a final symbol stream for each user.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The methods and embodiments of the Hybrid Turbo-MUD disclosed herein enable implementations of advanced receiver processing providing high quality real-time processing for multiple access systems, including overloaded conditions. The computational complexity that can separate co-channel interfering digitally modulated signals was heretofore an insurmountable problem. The preferred embodiment is an illustration of the digital processing technique that is applicable to many variations and applications all within the scope of the invention.

Figure 1:
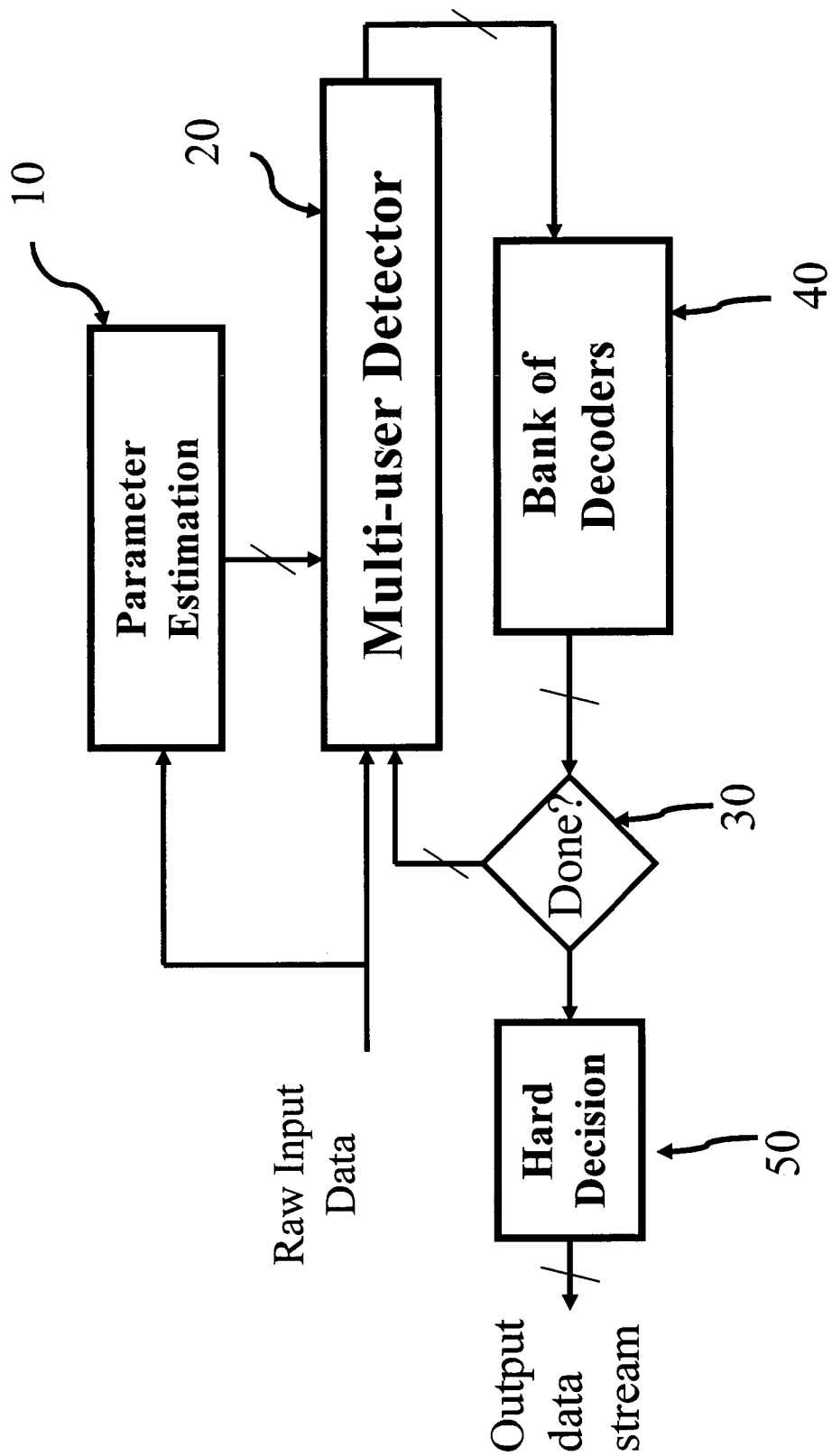
FIG. 1 shows a block diagrammatic presentation of prior art conventional MUD system illustrating the iterative processing that takes advantage of improvements in partial information gained with each iteration through the use of conditional probabilities for each decoded symbol of each user.

Referring to FIG. 1, the basic iterative MUD procedure is diagrammatically presented, and is well known from published literature such as Poor, "Turbo Multiuser Detection: An overview," IEEE $6^{th}$ Int. Symp. On Spread-Spectrum Tech. And Appli., NJIT, N.J. Sep. 6–8, 2000 and Alexander, Reed, Asenstorfer, and Schlegel, "Iterative Multiuser Interference Reduction: Turbo CDMA," IEEE Trans. On Comms., v41, n7, July 1999. The iterative MUD is representative of the approaches used to incorporate turbo decoding methods into joint MUD/FEC (Forward Error Correction) decoding and to then reduce the complexity of the system.

It should be readily appreciated that there are two general embodiments applicable to the MUD of FIG. 1, namely an iterative embodiment and a non-iterative embodiment. The iterative embodiment or Turbo-MUD is described herein while the non iterative MUD merely runs a single cycle through the process.

An input signal of raw non-manipulated data at the receiver (not shown) is comprised of the aggregate of many signals from many different transmitters, where each signal is assigned a signature pulse for the transmission of symbols. Traditionally, these signature pulses occupy either a specific frequency, timeslot, and/or spreading code and are referred to as occupying a specific channel from a finite set of channels. In a typical scenario, the aggregate signal is collected at the receiver (not shown), down-converted and digitized. The processing of the present invention enables the re-assignment of channels by users that are within close proximity, in other words, two or more users are assigned the exact same channel or signature pulse. Another realization of an interference-intended multiple access (MA) system would result by assigning users signature pulses (channels) that interfere with one another in any way, not having to be exact duplicates of another user's signature pulse or channel. The interference from the various in such an interference-intended MA system generally requires complex processing and inordinate amount of time which is solved by the present invention.

The raw input data represents data after some front end processing such as downconversion, amplification, and analog-to-digital conversion, although other forms of communication have been contemplated herein. This digital input signal or raw input data is then input to the multiuser detector (MUD) 20. The MUD processing can employ the various state of the art schemes, including M-algorithm, T-algorithm, Fano-algorithm and other tree-pruned approaches known to those in the art. MUD systems generally require some user signal parameters in order to establish accurate decision trees for processing.

A parameter estimation unit 10 processes the various parameters for the received raw data, and provides certain information to the MUD 20. The purpose of the parameter estimation module, 10, is to estimate timing offsets, signal amplitudes, carrier phases, polarizations, channel transfer functions, coding rates, identification of active channels, as well as any other information required by the MUD to carry out its processing. The parameter estimation unit is known in the art, and a detailed description is available in published patent application U.S. 2002/0037061 A1 entitled "System for Parameter Estimation and Tracking of Interfering Digitally Modulated Signals", which is incorporated by reference.

In an optimal case, the MUD detector 20 is a full-complexity maximum aposteriori (MAP) detector. Suboptimal reduced complexity MAP-based approaches are also known in the relevant art. The bit streams from the MUD 20 are passed to a bank of error correction decoders unit 40. In the non-iterative MUD, the raw data is processed by a MUD algorithm which outputs an estimate of each transmitted symbol corresponding to each active user/channel. These stream of symbols, likely corrupted by errors, are passed to the bank of error correction decoders unit 40, one for each user/channel, which is capable of outputting either a corrected symbol stream for each user (hard decision decoder) or a real number corresponding to the likelihood that each symbol is some specific value (soft decision decoder).

The MUD engine 20 within the TurboMUD can be structured for hard or soft output as well as hard or soft input processing, however in order to demonstrate a working embodiment, the soft input and soft output version is addressed herein, but it is well within the scope of the present invention to utilize any combinations of the other options.

In a Turbo-MUD system, decoding and confidence information is passed between the MUD 20 and decoder components 40. Maximum a posteriori (MAP) decoders (or approximations of MAP decoders) are well known to those in the art and are used for both the MUD and single-user (SU) decoders, so that soft output information is available if desired. The MUD 20 assumes knowledge of various parameters such as relative received timing offsets, carrier phase, frequency offsets, received amplitudes, and multipath structure for each of the interfering signals present in the received signal.

The multiuser detection unit 20 outputs a bit (or symbol) stream associated with each interfering signal present on the channel for one data block. Deinterleavers and interleavers (not shown) are optional elements coupled between the MUD 20 and the decoders 40 that are used if the transmitted signals are interleaved, such as the CDMA format. The MUD detector 20 passes either hard decisions or soft decisions in the form of reliability, or confidence, measures to the decoders 40. The reliability measures are presented with one associated with each symbol of each user to the bank of decoders 40. If the signals were transmitted with interleaving, the reliability measures from the MUD 20 are first passed through a deinterleaver (not shown) and passed on in shuffled form to the decoder 40. Shuffling refers to processing the same values but changes the placement or presentation of the values. If interleaving was present in the transmitter, an interleaver unit performs interleaving. The time-shuffled conditional probabilities are input back to the MUD section 20. When the transmitter employs interleaving it changes the presentation of the values but not the values themselves. For example, IS-95 is the North American Cell Phone standard that employs interleaving.

In one known variation, there is a bank of error correction decoders 40 that provide soft output or restore values associated with prior probabilities. Viterbi decoders can be used, but generally outputs hard values. The single user decoders calculate values of conditional probabilities, one for each decoded symbol of each user, and output them as confidence values back to the MUD 20. Soft input soft output decoders, such as MAP or soft-output Viterbi algorithm (SOVA) decoders are examples known in the art. As the output of the decoders 40 is taken here for discussion purposes to be soft values, it should be understood that the hard decision is optional depending upon the application and the implementation requirements.

MAP decoding is known in the art and further described in C. Schlegel, Trellis Coding, IEEE Press, 1997; Robertson, Villebrun and Hoeher, "A Comparison of Optimal and Sub-Optimal MAP Decoding Algorithms Operation in the Log Domain," ICC95; Hagenauer, and Hoeher, "A Viterbi Algorithm with Soft-Decision Outputs and its Applications," Globecom 89; Pottie and Taylor, "A Comparison of Reduced complexity Decoding Algorithms for Trellis Codes," J Sel. Areas in Comm Dec. 1989. The iterative turbo principle, on which Turbo MUD is based, is described by Berrou, Glavieux, and Thitimajshima, "Near Shannon Limit Error-Correcting Coding and Decoding: Turbo-Codes (1)," ICC 93; Berrou and Glavieux, "Near Optimum Error Correcting Coding and Decoding: Turbo-Codes", Trans on Comm, October 1996; and Wang and Kobayashi, "Low-Complexity MAP Decoding for Turbo Codes", Vehicular Technology Conference 2000]. Turbo MUD approaches are described in, for example, Alexander, Reed, Asenstorfer, and Schlegel, "Iterative Multiuser Interference Reduction: Turbo CDMA," Trans on Comm, July 1999; Poor, "Turbo Multiuser Detection: An Overview, "ISSSTA 2000; and Wang and Poor, "Iterative (Turbo) Soft Interference Cancellation and Decoding for Coded CDMA", Trans on Comm, July 1999.

For TurboMUD, soft outputs for each bit of each user from the bank of decoders 40 are fed back to the MUD 20 for each iteration. The multiuser detector 20 takes these soft inputs along with the original raw input signal to calculate an improved, less corrupted bit stream for each user. This iterative process continues until the desired quality is reached or a fixed number is reached 30. At that point, estimates of the data sequences for all active users are output. Operation then commences for the next block of data, repeating the process described above.

The number of iterations for processing between the MUD 20 and the decoders 40 can be set to a fixed counter or by checking if there were significant changes to the data from the last iteration. Once the data is no longer being altered or reaches a certain iteration counter limit, the data from the decoder 40 can be output as final estimates of what the user sent. A fixed number of iterations can be stored as the stopping point and used and processed by the decision block 30. Alternatively, the information between the MUD 20 and the decoders 40 repeats in subsequent iterations until an asymptote is reached or the desired performance level is attained. A buffer can store the previous values and compare them to the latter processed values during the iterative process.

When processing is completed, or Done? 30, the soft output of the bank of error decoders 40 is passed to a hard decision unit 50 which outputs the final stream of decisions or output data stream for each interfering user for the current data block. The process is repeated for all subsequent data blocks. As described herein, this prior art TurboMUD suffers from limitations with respect to real-time processing of data in a multi-user environment due to the complexity of the MUD processing. The optimal MUD (an exhaustive search of all possible received signals given the set of known parameters and known signature pulses) must check an inordinate number of possibilities. A good alternative to the exhaustive search in the pruned tree search such as the M-algorithm, T-algorithm, or Fano sequential decoder, all known to one of moderate competence in the art. The problem with these, however, is that when the number of interfering users is very large, as is often the case in an overloaded environment, the computational complexity required to achieve any reasonably good bit error rate would not allow for real time operation. In other words, the time it would take to do the processing with computing resources does not allow the decoded symbols to be output at the bit rate the user's are transmitting; causing the processor to fall farther and farther behind the transmitted information streams. There is another option for a truly low complexity MUD, however, there are other problems with using a truly low complexity suboptimal MUD for the MUD engine 20. Specifically, a low complexity MUD such as a minimum mean squared error (MMSE) MUD does a very poor job decoding all the user's symbols when the interference levels are very high, as is the case in an overloaded system.

Figure 2:
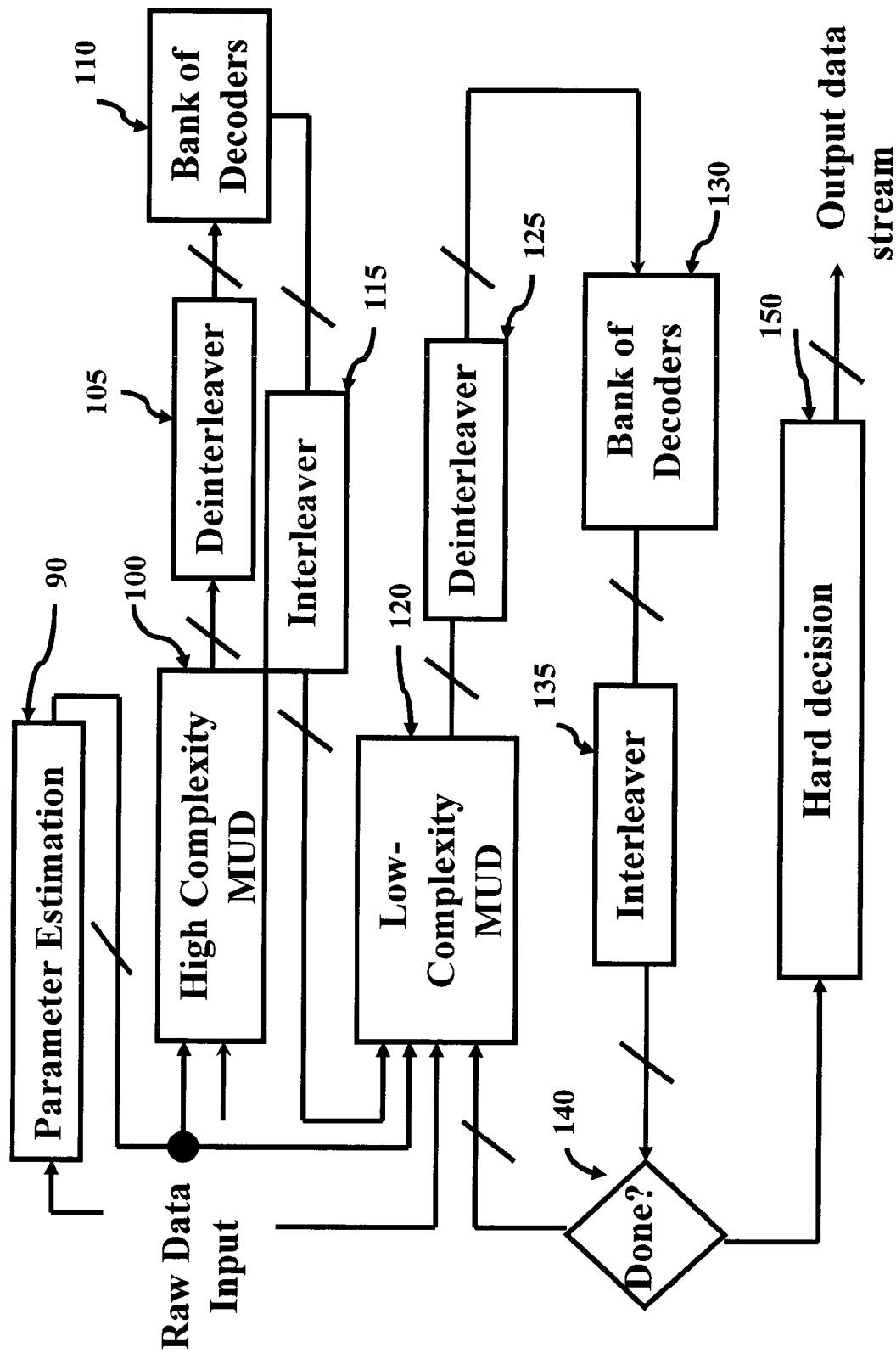
FIG. 2 is a block diagrammatic perspective showing a high complexity MUD for a first iteration with a first decoder bank, and a low complexity MUD followed by a second decoder bank for subsequent iterations, further incorporating optional interleaving and deinterleaving for those communications formats transmitting in these modes.

Referring to FIG. 2, which shows one embodiment the present invention which incorporates a high complexity MUD 100 on the first iteration but then standard low complexity MUD 120 processing for subsequent iterations. The first iteration is the most important in order to establish initial accuracy, and therefore uses the higher complexity MUD 100, with better performing algorithms such as M-algorithm, T-algorithm, FANO or reduced state Viterbi. For the remaining iterations of the Turbo-MUD, it will suffice to switch over to any of the lower complexity linear MUD algorithms 120, which allow the present invention to operate in real-time and with lower complexity computational processing. The first iteration high complexity MUD 100 jump starts the system in obtaining a 'better' starting foundation for subsequent processing. It is within the scope of the invention to use any tree pruned search for the high complexity MUD 100 in order to do good suboptimal searching to tree prune without having to do every search.

As an illustration of the high complexity MUD 100 as a tree pruning algorithm, consider a tree made up of nodes and branches. Each branch has a weight or metric, and a complete path is a sequence of nodes connected by branches between the root of the tree and its branches. The weight of each path is the sum of the branch metrics in a complete path. The goal of a tree searching algorithm is to try to find the complete path through a tree with the lowest metric. With the present invention, the metrics of multiple complete paths are not calculated. Rather, the metrics of individual branches in a tree are calculated in the process of locating one complete path through the tree and thereby defines one unknown characteristic of each of the co-channel, interfering signals needed to decode the signals.

It should be apparent to those skilled in the art that any tree pruned search such as Fano algorithm, M-algorithm, T-algorithm or reduced state Viterbi can be used to jump start the subsequent Turbo-MUD processing. The illustration and description of the M-algorithm is not a limitation to the invention and is merely one way to do a sub-optimal search that prunes some decisions without doing every possible search combination. This type of algorithm is better at a first iteration processing the data but does take more processing time than the low complexity MUD.

The high complexity MUD 100 outputs, for each user, a bit (or symbol) stream or a stream of soft values corresponding to the probability that a certain bit or symbol was sent by each user. The high complexity MUD is coupled to the parameter estimation unit 90 for obtaining information on the received signals. An optional deinterleaver 105 is employed for transmission received in an interleaved format, such as CDMA. These symbol streams are sent to a bank of error correcting decoders 110, which can be optionally interleaved 115 before being passed to the low complexity MUD 120. In one embodiment of this invention, decoders 110 provides soft outputs in the form of a stream of values corresponding to the probability that a certain bit or symbol was transmitted within each interfering user's signal present in the received signal. The soft data streams are passed to the low complexity MUD 120.

For this embodiment, low complexity MUD 120 is any low complexity soft decision input soft decision output multiuser detector known in the art. Furthermore, the entire TurboMUD section comprising the low-complexity MUD 120, optional deinterleaver 125, bank of decoders 130, optional interleaver 135, decision block 140, and hard decision block 150 could be replaced with the low-complexity iterative MUD such as described in the incorporated patent applications, or the linear-based soft decision MUD known in the art and described in Chan and Wornell, 'A Class of Asymptotically Optimum Iterated-Decision Multiuser Detectors', or Wang and Poor, 'Iterative (Turbo) Soft Interference Cancellation and Decoding for Coded CDMA', IEEE Trans. on Comms, July 1999, or Moher, "An iterative multiuser decoder for near capacity communication," IEEE Trans. on Comms., v46, n7, July 1998.

In another embodiment, the system could provide hard decisions with the low complexity MUD 120 and bank of decoders 130 described in the prior art for a reduced multi-access interference linear multiuser detector and hard decision error correction decoder.

The remainder of the present invention follows the more typical low complexity iterative Turbo MUD concepts known in the art that generally processes soft information. Alternatively, the system is easily adaptable to hard values. For ease of description, the soft information version known in the art is explained herein.

Referring again to FIG. 2, in one embodiment, soft bit (or symbol) decisions are passed to a bank of error correction decoders 130 from the low complexity MUD 120. Decoders 130 outputs soft values associated with the soft inputs, one stream of outputs for each interfering user present in the received signal. These soft outputs are passed back to the low complexity MUD 120 that produces an improved stream of soft bit (or symbol) decisions that fed into the decoder 130 for another iteration of improvement. The information between the low complexity MUD 120 and the decoders 130 repeats in subsequent iterations until an asymptote is reached or the desired performance level is attained. At that point, estimates of the data sequences for all active users are output. Operation then commences for the next block of data, repeating the process described above. The number of iterations for processing between the low complexity MUD 120 and the decoders 130 can be set to a fixed counter or by checking if there were significant changes to the data from the last iteration. Once the data is no longer being altered or reaches a certain iteration counter limit, the data from the decoder 130 can be output as final estimates of what the user sent.

When the desired quality of detection is reached (or a fixed number of iterations), and the processing is done 140, the soft output of decoder 130 is passed to the hard decision unit 150 for processing the hard decisions. The final stream of bits or symbols is output, one stream for each user present in the interfering signal.

FIG. 2 also shows the optional elements of the interleaver 135 and de-interleaver 125 used with interleaved transmissions, such as CDMA. The time-shuffled conditional probabilities are input back to the low complexity MUD algorithm 120. Interleaver 135 and de-interleaver 125 are optional elements used when interleaving is present in the transmitted communications. When the transmitter employs interleaving it changes the presentation of the values but not the values themselves. When interleaving is present in the transmitter, a transmitter interleaver unit (not shown) performs interleaving, and therefore requires the deinterleaver units 105, 125 and interleaver units 115, 135 on the reception end.

Figure 3:
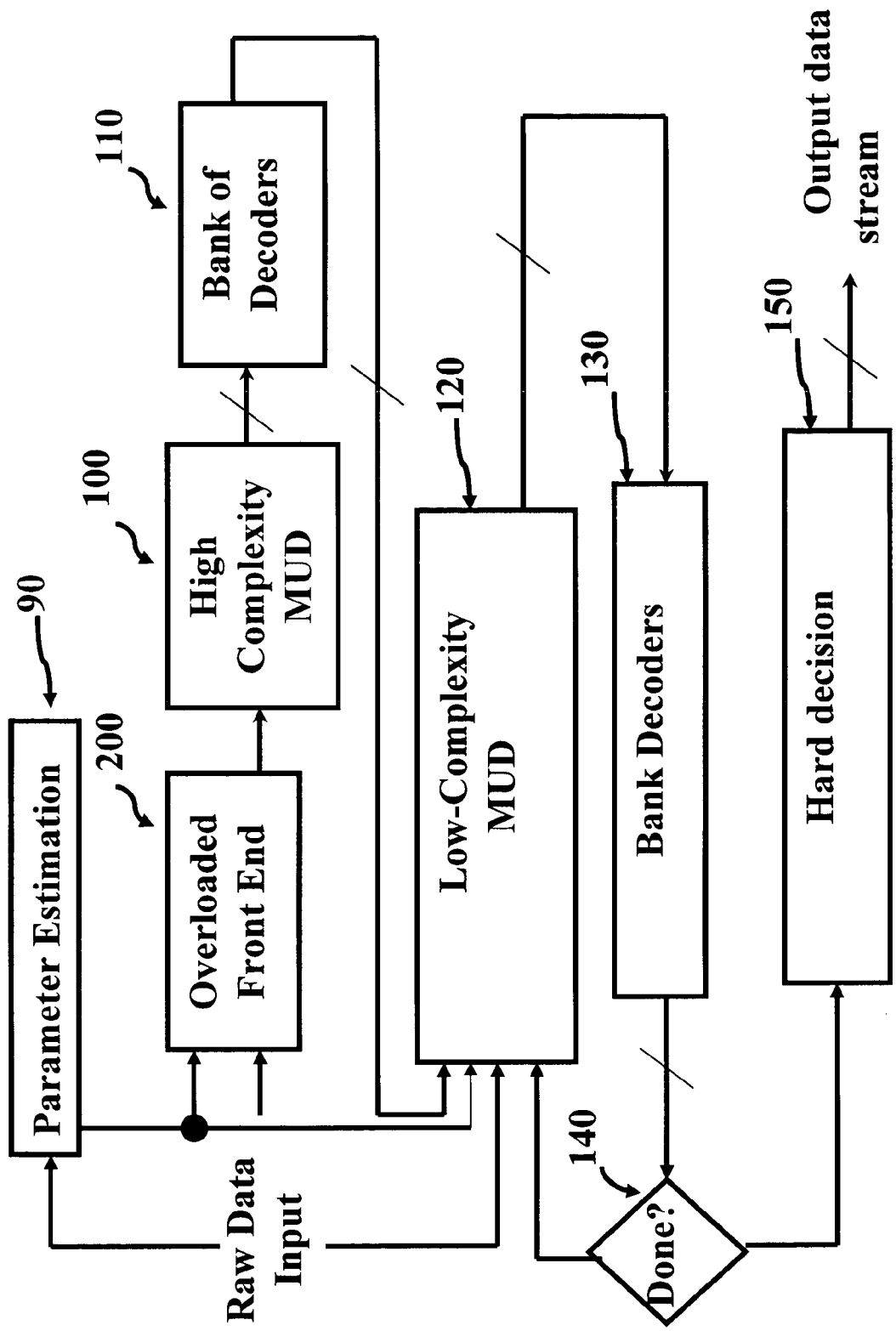
FIG. 3 is a block diagrammatic perspective showing an overloaded whitened front end, a high complexity MUD for a first iteration with a first decoder bank, and a low complexity MUD followed by a second decoder for subsequent iterations.

FIG. 3 shows another embodiment the present invention that uses an overloaded front end 200 for the first iteration in cooperation with the high complexity MUD 100 followed by a low complexity, possibly a linear based, soft decision MUD 120 for all subsequent iterations.

The received, downconverted, digitized, raw input signal is passed through a filter at the front end 200, such as a whitening matched filter, whitened-M algorithm pre-filter, or whitened matched filter. Unit 200 uses the information from the parameter estimation unit 90 to create a filter that will 'spread' or 'warp' the raw input signal so that it is easier to distinguish between the various users' signals that make up the received raw input signal. Supersaturated or overloaded conditions occur when the number of users exceeds the number of dimensions. Number of dimensions is determined by the physical parameters of the system. The present invention is easily adaptable to different filters in place of filter 200 if the filtering of the incoming signal offers an advantage to the pruned tree MUD 100. In certain applications, the filtering at the front end 200 is used to pre-process the received signal when the system is operating above state of the art capacity, e.g. overloaded. The number of transmitters that would cause the system to be overloaded would be one or more higher than the number of orthogonal channels that can be measured at the receiver. Unit 200 sends the filtered signal to the high complexity MUD 100 such as an M-algorithm pruned tree search.

An example of the front end 200 unit designed to handle overloaded conditions is described in pending U.S. application Ser. No. (10/423655), entitled "Deferred Decorrelating Decision-Feedback Detector For Supersaturated Communications". In this example, the filter is designed to account for overloaded communication schemes where the number of users exceeds the number of dimensions, and for symbol-asynchronous/symbol-synchronous communication configurations. The overloaded front end unit 200 for one embodiment incorporates a whitening filter that partially decouples the co-channel interference and partially whitens the noise. Other elements include an overloaded asynchronous whitener and a symbol-hypothesis testing section.

In one variation, the overloaded front end 200 partially decorrelates the multiaccess interference and simultaneously whitens the additive noise. This is accomplished by developing a pseudo-whitening filter based on a diagonally loaded correlation matrix. The diagonal loading technique is common in regression analysis to combat multi-colinearity, which is due to high correlation between independent variables. The purpose of this approach is to intentionally introduce a small bias, but reduce the variance of the unconstrained estimates prior to the decision process that occurs in the decision tree. In the supersaturated signaling scheme, the noise is nearly whitened and for the undersaturated case, the noise is completely whitened.

The M-algorithm, known in the art, can be used as the high complexity MUD, 100. In certain applications, the M-algorithm uses a decision tree approach that defers decisions until more evidence is accumulated, and it is a generalization that encompasses the jointly optimal maximum likelihood detector as well as the simpler decision feedback detector. The result is a hypothesis pruning procedure that performs a decision tree search by limiting the number of hypotheses extended to the next stage of the decision tree. The structure of the decision tree is typically determined by the filter bank (not shown) of the front end 200. The decision feedback techniques order the symbol hypotheses according to parameters such as the received power, SNR based, likelihood based, etc. Decisions are made sequentially on each symbol hypothesis and each decision is fed back to subtract the corresponding interference from the received data stream. The metric corresponding to a particular user's bit hypothesis at a stage in the decision tree consists of the Euclidean distance between the output of the one of the whitening filters and the hypothesized mean signal energy based on the bit hypothesis for the user in question and the mean signal energy corresponding to the hypotheses selected for users previously tested. In addition, this metric includes the accumulation of metrics corresponding to previous decisions. The output of symbol hypothesis testing is constrained estimates of the symbols for all users in the symbol period of interest. Various efficient decision tree search strategies can be employed in symbol-hypothesis testing. For example, the M-algorithm is one such approach that restricts the number of hypotheses at each stage to a fixed number. The T-algorithm is similar in nature to the M-algorithm however it restricts the number of hypotheses by comparing the accrued metric to a threshold. Extensions of this approach to other efficient approaches to decision tree searches are obvious The processing of the filtered data from the front end 200 is processed in a single iteration by the high complexity MUD 100 and the decoder bank 110. The subsequent iterations of processing occur between the low-complexity MUD 120 and decoders 130 as described herein with respect to FIG. 2, and may include the optional interleaver/deinterleaver elements.

Figure 4:
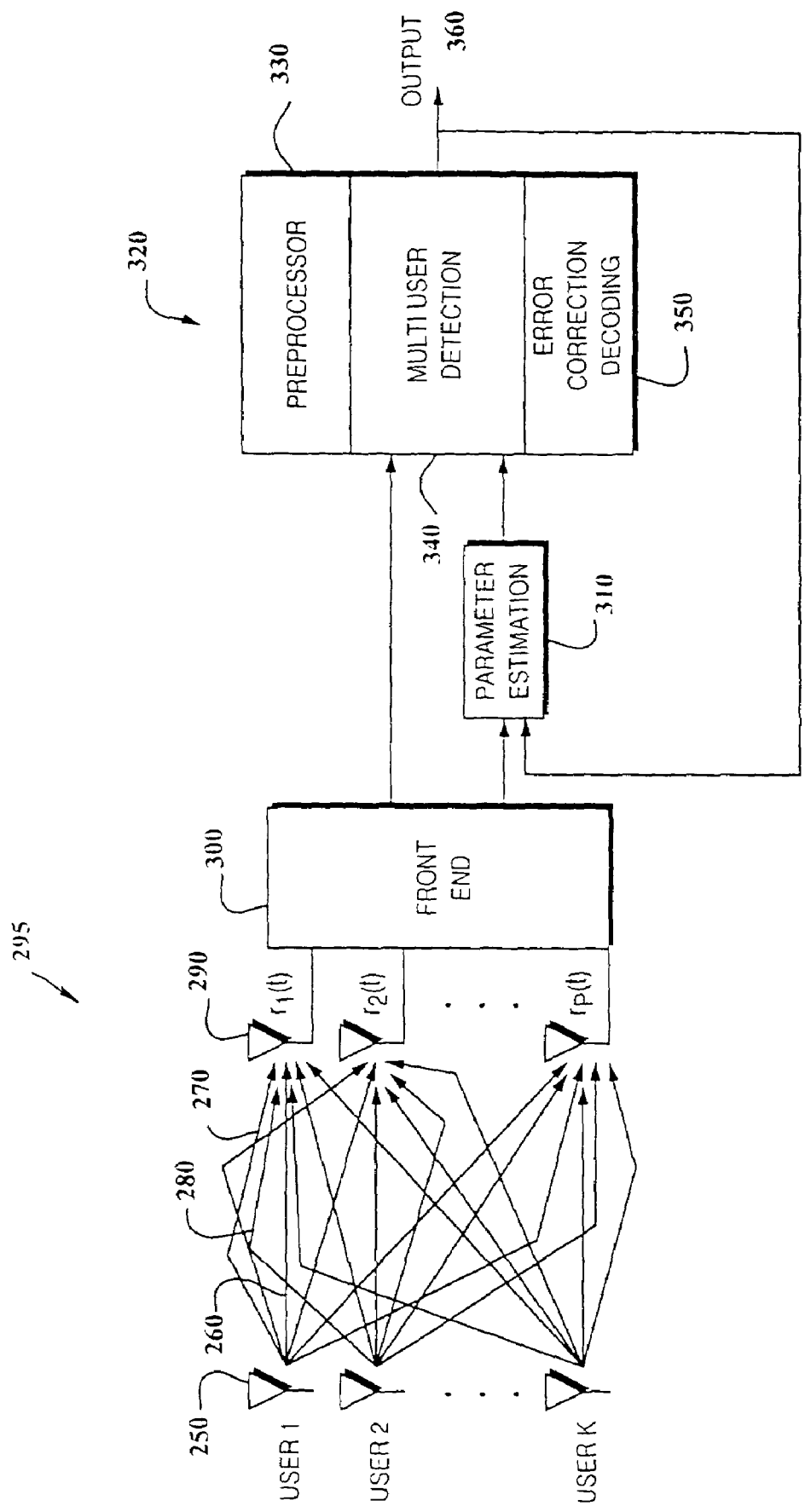
FIG. 4 shows an application of the present invention in a wireless communications system showing transmitted signals, reception, and basic MUD processing blocks for resolving the user signals.

A typical communication wireless application for the present invention from a top perspective is shown in FIG. 4, wherein a number of users (1-K) generate signals that are sent by transmitters 250 into free space. There is normally a noise component 295 that is introduced from the environment of a random nature in the received signal. The various signals are received at antennas (1-p) 290, wherein there is one signal for each polarization feed. The signals represent directly received signals 260, as well as multi-path signals 270 from the same user, and interfering signals 280 from other users.

The plurality of signals from each antenna 290 is processed in a RF front end unit 300. The front end unit 300 downconverts the higher frequency signals into baseband signals for ease of processing. The baseband signals are also digitized by analog to digital converters (A/D). The front end cooperates with the parameter estimation unit 310 to retrieve needed information for the signals such as relative received timing offsets, carrier phase, frequency offsets, received amplitudes, and multipath structure for each of the interfering signals present in the received signal.

The MUD element 320 consists of functional blocks that process the digital data and extract the user symbol streams. The pre-processor 330 converts the baseband digital data into the proper format for further processing according to the desired detection scheme and whitens it. The format is often one measurement per 'dimension' per symbol. An example of this processing is a bank of matched filters followed by a measurement whitening filter. The multi-user detection stage 340 is detailed herein and cooperates with the error correction decoding (ECD) 350 for iterations of the processing of the hybrid Turbo-Mud as detailed herein employing a high complexity MUD and decoder section and a low complexity MUD and decoder section.

The output of the MUD element 320 can, optionally, be returned for a number of iterations in conjunction with the parameter estimation unit 310 that uses the returns to improve the parameter estimates that are used to define the whitener and both the low and high complexity MUD processing. When the output K bit stream 360 has reached a certain level of processing as described herein, the output signals are forward to the output stage (not shown). Alternatively the number of iterations can be used to fix the amount of processing.

Figure 5:
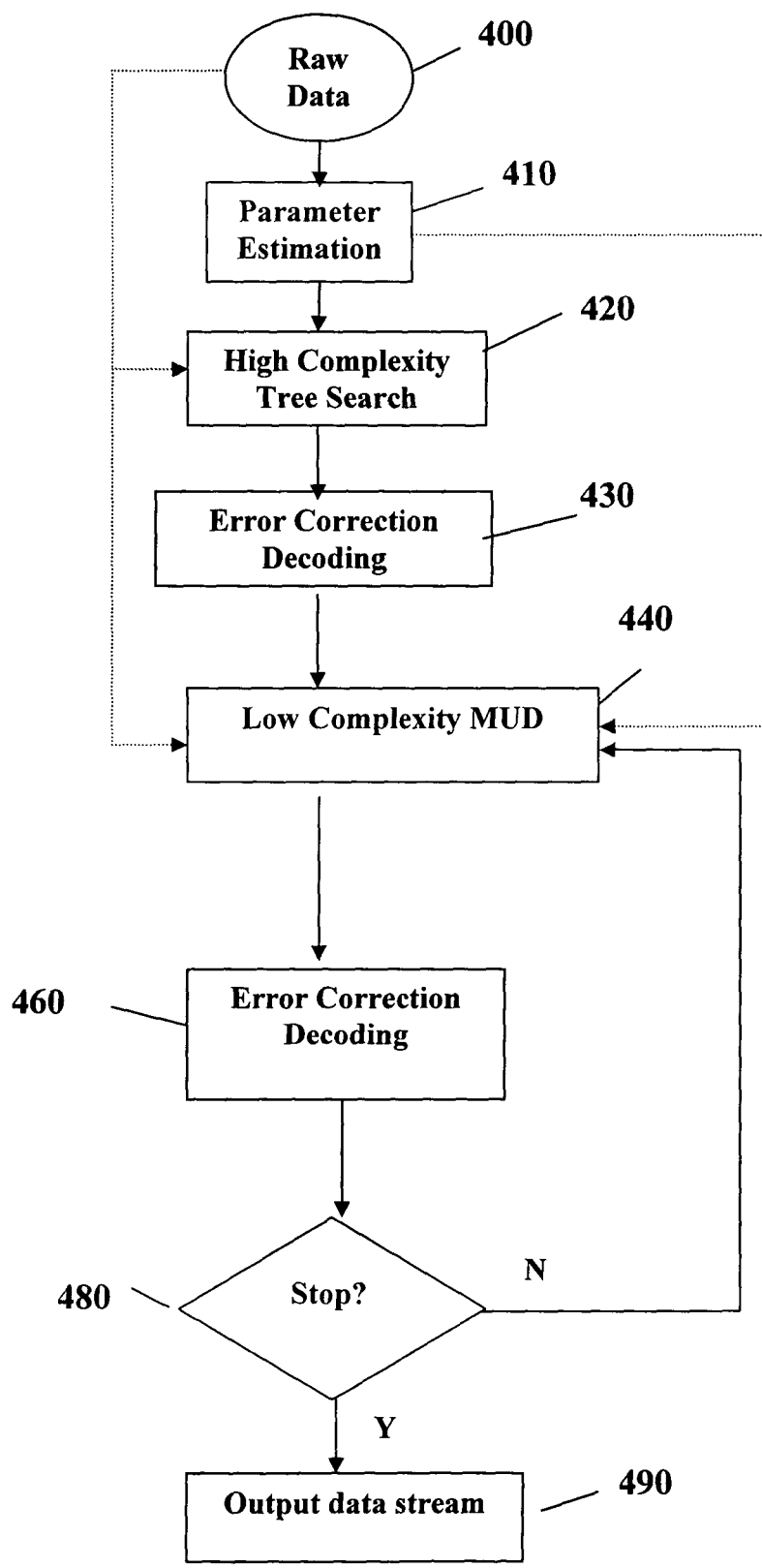
FIG. 5 illustrates a basic elemental flow chart of the signal processing techniques of the present invention.

The processing of the present invention for one embodiment is shown in FIG. 5. A raw data stream 400, potentially complex, is received from some a source. For the case of Code Division Multiple Access (CDMA) communications schemes, the data stream is sampled by some multiple of the chip rate. For TDMA communication schemes, the data stream is sampled at some multiple of the symbol rate.

The data 400 represents a vector of data, transferred at some rate (e.g., the symbol rate) and can be initially processed by the front end whitening filter 200 of FIG. 3. This data 400 is input and processed by parameter estimation 410, wherein the processing of the parameter estimation is well known to those skilled in the art. The purpose of the parameter estimation processing is to estimate timing, signal amplitudes, phases, polarization, and/or identification of transmission channels. Estimates of the parameters are passed to the front end (not shown) and estimates of the parameters are also passed to the high complexity and low complexity MUD sections.

The next step involves the high complexity MUD 420 and uses the raw data to perform high complexity processing, such as utilizing an M-algorithm, to make a 'jump start' on the processing and form a better decisions on a number of the user's symbol streams, to allow the low complexity MUD a smaller number of undetermined user symbol streams, a scenario for which the low complexity MUD can work well. The output of the high complexity decoder 430 after the first iteration is input to the iterative low complexity MUD 440. As shown, the first iteration of the high complexity MUD 420 processing is performed once to establish the data with sufficient accuracy for the lower level processing that allows faster processing. One or more iterations of the high complexity processing is also within the scope of the invention.

The steps of deinterleaving and interleaving in the appropriate places are optional elements that can be incorporated as described herein. The output of the low complexity MUD 440 is input to the bank of decoders for decoding and error correction decoding 460.

In a non-iterative implementation the processing would only occur once, however iterative processing of the low complexity MUD continues until certain parameters are met. In a first test, a fixed variable such as three or four iterations can be used as the total number of iterations performed, wherein a simple counter will maintain track of iterations and stop 480 the processing accordingly. Alternatively, there can be a buffer to store the last iteration value and when the number of changes as compared from a last iteration to the present iteration reaches a satisfactory level the iterations are stopped 480. Finally, the data is output 490 for subsequent utilization for the intended application.

Another application of the invention is to allow for multi-user detection for a variety of communications formats. The processing scheme of the present invention manipulates bits utilizing some apriori information so that the system has some knowledge of what the signals were supposed to have been had they been received individually and without interference or other impairments. One application which shows a non-CDMA environment is to the application involving GSM, which is a narrow band TDMA system. The user communicates over a timeslot and when the time slot is filled, another user has to wait until an open slot is available. The present invention allows reassignment of the timeslot so that signals from a second user can overlay with a first user. The only distinguishing characteristics, other than the fact that they are sending different symbol streams, would be phase, fine timing offsets, received polarization orientation, and power differences that can be employed as described herein to differentiate user 1 from user 2. Another example relates to communications in airplanes, wherein there will be multiple users trying to communicate within a given bandwidth. The present scheme allows these multiple users to function within the same region by picking apart attributes that distinguish one user from another.

It is readily apparent that the hybrid TurboMUD technique is used in a variety of applications and with varied methods for implementing the system, and is therefore not limited to the embodiments presented herein. Variations and modifications may be made without departing from the scope of the present invention, and the reference to processing received signals is applicable to signals received from numerous implementations and not merely a wireless receiver. The hybrid Turbo-MUD technique described herein can be incorporated within numerous other MUD and TurboMUD implementations disclosed in the art and in the related pending applications.

For example, the commonly owned patent applications describing varied forms of multi-user systems are hereby incorporated by reference for all purposes and include U.S. Pat. No. 6,839,390; U.S. Pat. No 7,110,439; and U.S. application Ser. No. (10/423,655), filed Apr. 25, 2003, titled "Deferred Decorrelating Decision-Feedback Detector for Supersaturated Communications".

While the operation of the subject system has been described in terms of a wireless communications network, it has application to any situation in which digitally encoded interfering signals exist. Thus, the subject system has application to cable networks in which multiple users are seeking to communicate with a head end system simultaneously. In another embodiment, the present system is incorporated into reading storage mediums, such as computer hard drives, and to separate signals from adjacent tracks when the read head overlies portions of adjacent tracks. With the increasing density of storage devices such as hard drives, memory cards, and various storing discs, there are significant commercial advantages and incentives to place more data on smaller spaces and being able to quickly and reliably extract the data. The processing schema of the present invention is easily tailored to such an application as the data from the compact tracks of the recorded medium from the storage devices resembles wireless data bits and requires processing to promptly access and retrieve the desired data. The MUD processing with respect to the storage devices refer to the plurality of signals received when the optical head picks up the signals of the adjacent tracks of the storage mediums. The tight spacing between the tracks creates a multiple user detection problem involving the processing of the desired track signal from the other received tracks.

A further application of the present invention is in a cable modem environment. The Cable Modem Termination System provides the head end interconnect for a plurality of individual cable modems for the transmission of data. In rough terms, the cable modem functions like a local area network (LAN). The cable modem itself combines an upstream modulator and a downstream demodulator. Most current networks are hybrid-fiber-coax networks using fiber for the main lines and coax cable connecting to the individual houses and cable modems. Inside the home, the cable modem can be connected to any of the various devices such as TV for cable television programs. It also provides Internet connectivity, interactive TV interface, smart appliance operation, and email access among other functions. The Cable Modem Termination System (CMTS) connects to the main grid that connects to a number of cable modems. The cable modems connect to a variety of devices, such as personal computer and televisions. The present invention allows the use of the data processing from the CMTS to each of a plurality of houses in a fashion similar to the base station deployment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A hybrid Multi-User Detector for processing raw input data comprised of a plurality of received signals, comprising:

a parameter estimation unit that obtains information from said received signals, at least some of said information corresponding to transmitted signals;

a high complexity multi-user detector coupled to said parameter estimation unit, wherein said high complexity multi-user detector performs a pruned tree search and outputs a plurality of information streams, one stream corresponding to each of said transmitted signals;

a bank of high complexity error correction decoders coupled to said high complexity multi-user detector, wherein said bank of high complexity error correction decoders outputs a plurality of refined information streams;

a low complexity multi-user detector coupled to said bank of high complexity error correction decoders and said parameter estimation unit, wherein said low complexity multi-user detector outputs a plurality of improved information streams; and a bank of low complexity error correction decoders coupled to said low complexity multi-user detector, wherein said bank of low complexity error correction decoders outputs a plurality of refined-improved information streams, said plurality of refined-improved information streams fed back to said low complexity multi-user detector until a final condition is reached and said bank of low complexity error correction decoders outputs a final plurality of symbol streams.

2. The hybrid Multi-User Detector according to claim 1, wherein said high complexity multi-user detector uses algorithms selected from at least one of the group consisting of: M-algorithm, T-algorithm, Fano algorithm, and reduced state Viterbi.

3. The hybrid Multi-User Detector according to claim 1, wherein at least one of said bank of low complexity error correction decoders and said bank of high complexity error correction decoders is selected from at least one of the group consisting of: maximum a posteriori (MAP) decoders and soft-output Viterbi algorithm (SOVA) decoders.

4. The hybrid Multi-User Detector according to claim 1, further comprising a first deinterleaver coupled between said high complexity multi-user detector and said bank of high complexity error correction decoders, a first interleaver coupled between said bank of high complexity error correction decoders and said low complexity multi-user detector, a second deinterleaver coupled between said low complexity multi-user detector and said bank of low complexity error correction decoders and a second interleaver coupled between said bank of low complexity error correction decoders and said low complexity multi-user detector.

5. The hybrid Multi-User Detector according to claim 1, wherein said final condition is a fixed number of iterations.

6. The hybrid Multi-User Detector according to claim 1, wherein said final condition is determined by an allowable performance level.

7. The hybrid Multi-User Detector according to claim 1, further comprising a filter unit coupled between said parameter estimation unit and said high complexity multi-user detector.

8. The hybrid Multi-User Detector according to claim 7, wherein said filter unit is selected from at least one of the group consisting of: whitening matched filter bank and matched filter bank.

9. The hybrid Multi-User Detector according to claim 1, further comprising a hard decision unit coupled to said bank of low complexity error correction decoders and producing said final plurality of symbol streams.

10. A hybrid receiver for processing received signals comprised of a plurality of transmitted signals and interfering signals in an overloaded condition, said receiver comprising:

a parameter estimation unit that obtains information from said received signals, wherein said parameter estimation unit extracts signal information corresponding to said transmitted signals;

a front end section that obtains information from said received signals and is coupled to said parameter estimation unit to produce a plurality of filtered signals;

a high complexity multi-user detector coupled to said front end section, wherein said high complexity multi-user detector performs a pruned tree search and outputs a plurality of information streams, one stream corresponding to each of said filtered signals;

a bank of high complexity error correction decoders coupled to said high complexity multi-user detector, wherein said bank of high complexity error correction decoders outputs a plurality of refined information streams;

a low complexity multi-user detector coupled to said bank of high complexity error correction decoders and said parameter estimation unit, wherein said low complexity multi-user detector outputs a plurality of improved information streams; and a bank of low complexity error correction decoders coupled to said low complexity multi-user detector, wherein said bank of low complexity error correction decoders outputs a plurality of refined-improved information streams, said plurality of refined-improved information streams fed back to said low complexity multi-user detector until a final condition is reached and said bank of low complexity error correction decoders outputs a final plurality of symbol streams.

11. The hybrid receiver according to claim 10, wherein said high complexity multi-user detector uses algorithms selected from at least one of the group consisting of: M-algorithm, T-algorithm, Fano algorithm, and reduced state Viterbi.

12. The hybrid receiver according to claim 10, wherein at least one of said bank of low complexity error correction decoders and said bank of high complexity error correction decoders is selected from at least one of the group consisting of: maximum a posteriori (MAP) decoders and soft-output Viterbi algorithm (SOVA) decoders.

13. The hybrid receiver according to claim 10, wherein said low complexity multi-user detector or said high complexity multi-user detector is structured for input and output processing as selected from the group consisting of: a soft decision input soft decision output, a hard decision input hard decision output, a soft decision input hard decision output, and a hard decision input soft decision output.

14. The hybrid receiver according to claim 10, wherein said final condition is a fixed number of iterations.

15. The hybrid receiver according to claim 10, wherein said final condition is determined by an allowable performance level.

16. The hybrid receiver according to claim 10, wherein said front end section comprises a filter unit.

17. The hybrid receiver according to claim 16, wherein said filter unit is selected from at least one of the group consisting of: bank of whitening matched filters and bank of matched filters.

18. The hybrid receiver according to claim 10, wherein said front end section comprises a bank of matched filters, an overloaded asynchronous whitener, and a symbol-hypothesis testing section.

19. The hybrid receiver according to claim 10, further comprising a hard decision unit coupled to said bank of low complexity error correction decoders and producing said final plurality of symbol streams.

20. A method for processing signals from raw digitized data from multiple users comprising:

performing parameter estimation of said raw digitized data;

computing decision tree searching path metrics from said raw digitized data using a high complexity multi-user detector in a first iteration and outputting one symbol stream for each user;

decoding said one symbol stream for each user from said high complexity multi user detector by a bank of high complexity error correction decoders and producing a higher quality symbol stream for each user;

incorporating the information from said higher quality symbol stream into a low complexity multi-user detector and providing an improved version of symbol streams, one for each user;

decoding said symbol streams output from the low complexity multi-user detector;

repeating incorporating information from said improved version of symbol streams into the low complexity multi-user detector and decoding of each symbol stream output by a bank of low complexity error correction decoders until a final state is obtained; and, outputting a final symbol stream for each user.

21. The method for processing signals according to claim 20, wherein said final state is determined by a fixed number of iterations.

22. The method for processing signals according to claim 20, wherein said final state is determined by establishing an allowable difference in symbol values from a last iteration value to a present iteration value.

23. The method for processing signals according to claim 20, further comprising de-interleaving prior to said decoding by said bank of high complexity error correction decoders and said bank of low complexity error correction decoders and interleaving subsequent to said decoding by said bank of high complexity error correction decoders and said bank of low complexity error correction decoders.

24. The method for processing signals according to claim 20, further comprising filtering said raw digitized data.

25. The method for processing signals according to claim 20, wherein computing the decision tree searching path metrics using said high complexity multi-user detector in at least one additional iteration.

* * * * *

UNITED STATES PATENT AND TRADEMARK OFFICE
CERTIFICATE OF CORRECTION

PATENT NO.        : 7,218,690 B2  
APPLICATION NO. : 10/626146  
DATED              : May 15, 2007  
INVENTOR(S)       : Rachel E. Learned Page 1 of 1

It is certified that error appears in the above-identified patent and that said Letters Patent is hereby corrected as shown below:

Column 11  
Line 48, should be changed to "An Overview," ISSSTA 2000;"

Column 12  
Line 39, insert --of-- after "embodiment"

Column 19  
Line 38, insert --each output of-- after "between"

Signed and Sealed this

Nineteenth Day of May, 2009

JOHN DOLL  
*Acting Director of the United States Patent and Trademark Office*